United States Patent Office 3,053,620
Patented Sept. 11, 1962

3,053,620
PURIFICATION METHOD FOR METAL HALIDES
Harry Greenberg and Hyman R. Lubowitz, Cincinnati, Ohio, assignors to National Distillers and Chemical Corporation, New York, N.Y., a corporation of Virginia
No Drawing. Filed Feb. 12, 1958, Ser. No. 714,704
9 Claims. (Cl. 23—87)

This invention relates to a new and improved method for the purification of zirconium tetrahalides, hafnium tetrahalides and mixtures thereof. More specifically, the invention pertains to a method for separating undesirable metal halide impurities from these metal tetrahalides.

For the purposes of illustration, the invention will be described primarily with respect to the purification of impure zirconium tetrahalides, though it is to be understood that the present purification method is also applicable to the treatment of impure hafnium tetrahalides either by itself or in association with impure zirconium tetrahalides.

Zirconium tetrahalides are ordinarily produced by halogenating various zirconium-containing ores under well established conditions. The resulting zirconium tetrahalide products are usually contaminated with halides of other metals which were present in the ores. In the preparation of zirconium tetrahalide from zircon sand, for example, the impurities have included the halides of such metals as iron, aluminum, magnesium, manganese, nickel, silicon, tin, titanium, vanadium, etc. Hafnium, which is ordinarily associated in nature with zirconium and which is difficult to separate therefrom, will not be considered an undesirable impurity for the present purposes. As is well known, the presence of the metal halide contaminants in zirconium tetrahalide is undesirable. Thus, in the preparation of zirconium metal from the tetrahalides the aforementioned metal impurities will have a deleterious effect on the properties of the metal product as well as introducing complicating factors into the known reduction process.

Most of the undesirable metal halide impurities may be readily removed or substantially reduced below contaminating levels by subjecting the impure zirconium tetrahalide to distillation. It has been found, however, that iron and aluminum halide impurities cannot be separated from the zirconium tetrahalides by this method. The removal of iron halide impurities can be accomplished by directly contacting the impure zirconium tetrahalide, following distillation, with certain reducing agents such as zinc, cadmium and manganese. Recently it also has been proposed that such removal may be effectively carried out by contacting zirconium tetrahalide vapors with metallic iron in the form of iron filings or iron wool. However, these heretofore proposed methods do not remove the aluminum halide, and the present invention is particularly directed to this feature.

It is one object of the present invention to accomplish the removal of the aluminum halide impurities without loss of zirconium tetrahalide. Another object of the invention is to provide a method for the effective removal of both iron and aluminum contaminants from impure zirconium tetrahalide. Further objects will become apparent from the ensuing description of the invention.

In accordance with the present invention, it has now been found that the aluminum halide impurities may be substantially removed or reduced below contaminating levels along with iron halide impurities by contacting the impure zirconium tetrahalide with calcium chloride. A particularly outstanding feature of the present invention is the discovery that by treating the impure zirconium tetrahalide with calcium chloride substantially no zirconium tetrahalide is lost. In general, the impure zirconium tetrahalide is directly contacted with the calcium chloride at temperatures within the range of about 300° to 450° C., preferably about 320° to 380° C. The calcium chloride may be utilized in a number of different forms. As more clearly set forth below, the calcium chloride may be conveniently employed in granular form or supported on an inert material such as glass wool or other inert carriers.

The process of the invention may be carried out in various ways. It is possible, for example, to treat the impure zirconium tetrahalide obtained from the halogenation of zirconium-containing ores in accordance with one of the established methods for removing all of the undesirable impurities except the iron and aluminum halides. The thus treated zirconium tetrahalides may then be contacted directly with the calcium chloride for simultaneous removal of both the iron and aluminum halide impurities. Another possible method for carrying out the process of this invention would be the utilization of the calcium chloride in combination with one of the known agents for removing the iron halide impurities. This process may be carried out by first contacting the impure zirconium tetrahalide containing the iron and aluminum halides with the iron halide removal agent followed by direct contact with the calcium chloride. In accordance with the preferred method of the present invention, however, the impure zirconium tetrahalide is contacted directly with calcium chloride for the removal of the iron and aluminum halide impurities. It will be understood, of course, that both of the aforementioned methods may utilize a preliminary distillation step to substantially remove or reduce below contaminating levels all of the aforementioned contaminants other than the iron and aluminum halides. This distillation step may be carried out at temperatures within the range of about 330° C. to 450° C. It will be further understood that the process may be so arranged that the zirconium tetrahalide vapors recovered from the distillation step may be treated directly by passage through a fixed or fluidized bed of calcium chloride in a continuous or semi-continuous manner.

The invention will be more fully understood by reference to the following illustrative examples. Though impure zirconium tetrachloride is used in each of these examples, it will be understood that the tetrabromides and tetraiodides of zirconium may also be effectively utilized as feed material.

EXAMPLE I

Experiment 1

Impure zirconium tetrachloride, having the spectrographic analysis set forth in the table below, was distilled at a temperature of about 350° C. to obtain a light brown zirconium tetrachloride distillate having the spectrographic analysis set forth below in the third column.

Experiment 2

14.0 grams of the same impure zirconium tetrachloride feed used in Experiment 1 was distilled through a bed of 13.5 grams of anhydrous calcium chloride in a Pyrex tube (I.D. 12 mm.) maintained at a temperature between 357° and 361° C. A white distillate of zirconium tetrachloride, weighing 13.8 grams, was recovered. The spectrographic analysis of the recovered material is set forth below.

Experiment 3

A second charge of 14.7 grams of the impure zirconium tetrachloride employed as the feed in Experiment 1 was distilled through the calcium chloride bed of Experiment 2 maintained at a temperature between 326° and 360° C.

A white distillate of zirconium tetrachloride, weighing 13.9 grams, was recovered. The spectrographic analysis of the recovered material is set forth below.

*Experiment 4*

Utilizing the same operating conditions of Experiment 2, the impure zirconium tetrachloride feed was passed through a bed of steel wool and calcium chloride supported on glass wool. In another run, the impure zirconium tetrachloride was distilled through a bed of steel wool and granulated calcium chloride. White zirconium tetrachloride products, having the spectrographic analysis set forth below, were recovered in both runs.

TABLE 1

| Element | Feed | Expt. 1 Distillate | Expt. 2 Distillate | Expt. 3 Distillate | Expt. 4 Distillate A | Expt. 4 Distillate B |
|---|---|---|---|---|---|---|
| Aluminum | 350 | 100 | 30 | 30 | 50 | 30 |
| Chromium | 50 | 10 | 33 | 10 | | |
| Iron | 1,050 | 800 | 60 | 60 | 50 | 87 |
| Magnesium | 51 | 10 | 12 | 10 | | |
| Nickel | 41 | 10 | 10 | 10 | | |
| Lead | 13 | 10 | 14 | 10 | | |
| Silicon | 750 | 30 | 50 | 55 | | |
| Titanium | 500 | 30 | 120 | 20 | | |

1 Spectrographic analyses (p.p.m.).

In order to determine the possible mechanism involved in the purification process of this invention feeds of aluminum chloride and ferric chloride, respectively, were distilled through a calcium chloride bed as shown in the following example.

EXAMPLE II

*Experiment 1*

Approximately 20 grams of anhydrous calcium chloride (12 mesh) was charged into a Pyrex tube (I.D. 12 mm.). The material was heated at 350° C. for about 2 hours in order to drive over the residual water. Aluminum chloride was then distilled through the calcium chloride bed maintained between 350–380° C. The calcium chloride was considered saturated with respect to aluminum chloride when distillate appeared from the bed, and it was noted that the increased weight of the bed was approximately 12 grams. Examination of the bed at 350° C. showed that a portion of the bed was in the liquid state which is believed to be a calcium aluminum chloride complex.

*Experiment 2*

About 18.6 grams of ferric chloride was distilled through a bed of 23.7 grams of anhydrous, 8 mesh, calcium chloride (preheated 2 hours at 350° C.) in a Pyrex tube (I.D. 12 mm.) maintained between 350° and 380° C. For two hours no ferric chloride distillate was noted. Examination of the bed at 350° C. showed that it was black in color, and that a portion of it was in the liquid state which is believed to be a calcium iron chloride complex.

The above data show that undesirable aluminum and iron impurities can be effectively removed from zirconium tetrahalides by utilizing the method of this invention.

Moreover, the above data further show that calcium chloride is an outstanding material for this purpose since it effectively removes the contaminating aluminum and iron halides without appreciably lowering the percentage of zirconium tetrahalide recovered.

In accordance with another aspect of the invention, it has been found that a spent bed of calcium chloride, which was employed to remove the aluminum and iron halide impurities from zirconium tetrachloride, could be regenerated by heating to temperatures above about 450° C. It is obvious that a number of advantages will result when such a regeneration procedure is utilized in the present process.

While particular embodiments of this invention are shown above, it will be understood that the invention is obviously subject to variations and modifications without departing from its broader aspects.

What is claimed is:

1. A process for purifying impure metal halide selected from the group consisting of zirconium tetrahalide, hafnium tetrahalide and mixtures thereof, containing aluminum halide and iron halide impurities which comprises contacting said impure metal halide in vapor form with a substance consisting essentially of calcium chloride in solid form at a temperature within the range of about 300° to 450° C., and recovering purified metal halide vapors.

2. The process of claim 1 wherein said temperature is within the range of about 320° to 380° C.

3. The process of claim 1 wherein said impure metal halide is zirconium tetrahalide.

4. The process of claim 1 wherein said impure metal halide is zirconium tetrachloride.

5. The process of claim 1 wherein said impure metal halide is hafnium tetrahalide.

6. A process for treating impure metal halides selected from the group consisting of zirconium tetrahalide, hafnium tetrahalide and mixtures thereof, containing metal halide contaminants which comprises distilling said impure metal halides to recover said metal halides substantially free of metal halide contaminants other than iron and aluminum halides, contacting said recovered metal halides in vapor form with a substance consisting essentially of calcium chloride in solid form at a temperature within the range of about 300° to 450° C. to effect substantial removal of aluminum halide and iron halide impurities, and recovering purified metal halide vapors.

7. The process of claim 6 wherein said impure metal halide is zirconium tetrahalide.

8. The process of claim 6 wherein said zirconium tetrahalide is zirconium tetrachloride.

9. The process of claim 6 wherein said impure metal halide is hafnium tetrahalide.

References Cited in the file of this patent

UNITED STATES PATENTS

| | | |
|---|---|---|
| 2,443,253 | Kroll et al. | June 15, 1948 |
| 2,533,021 | Krchma | Dec. 5, 1950 |
| 2,744,060 | Eaton | May 1, 1956 |
| 2,928,722 | Scheller | Mar. 15, 1960 |